March 10. 1925.

J. A. KAMMERDINER

ROTARY JAR

Filed Jan. 19, 1924

1,529,544

INVENTOR.
James Allen Kammerdiner
BY Westall and Wallace
ATTORNEYS

Patented Mar. 10, 1925.

1,529,544

UNITED STATES PATENT OFFICE.

JAMES ALLEN KAMMERDINER, OF LOS ANGELES, CALIFORNIA.

ROTARY JAR.

Application filed January 19, 1924. Serial No. 687,313.

*To all whom it may concern:*

Be it known that I, JAMES ALLEN KAMMERDINER, a citizen of the United States, and resident of Los Angeles, in the county of Los Angeles, State of California, have invented new and useful Improvements in Rotary Jars, of which the following is a specification.

This invention relates to a jar for use in drilling wells and the like. It is especially useful in fishing for lost tools in the hole. In fishing, the object is to obtain a grip upon the parts to be removed and then to lift the latter. The lost parts become stuck in the hole due to various reasons and jarring assists in loosening the parts being fished for. In hydraulic rotary drilling, it is essential that a circulation of water or mud be maintained in the hole, and the circulation must be maintained even during the cessation of the drilling operations. The present invention is adapted to maintain circulation while fishing is being resorted to.

The primary object of this invention is to provide a jar consisting of parts slackly linked together and so arranged that a strain may be placed upon the string by an upward pull, and which may be tripped to produce an impact by rotating the jar; and second to provide details of construction, whereby a jar having a long life and great strength may be secured.

Figure 1:
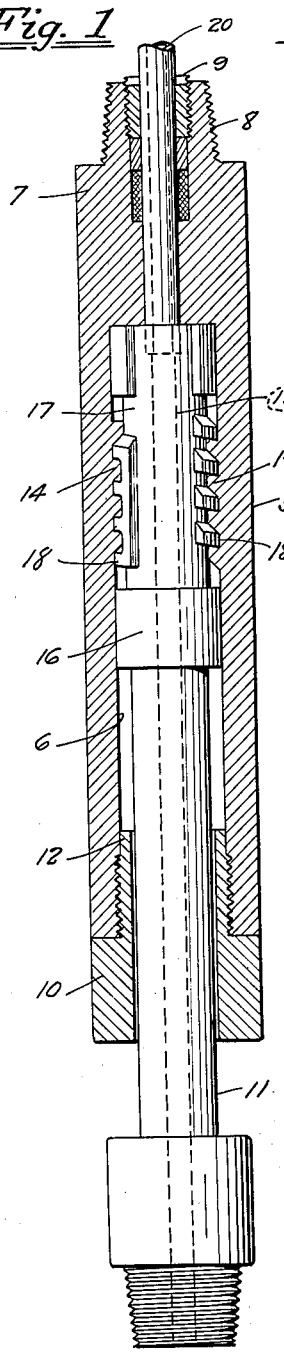
Figure 2:
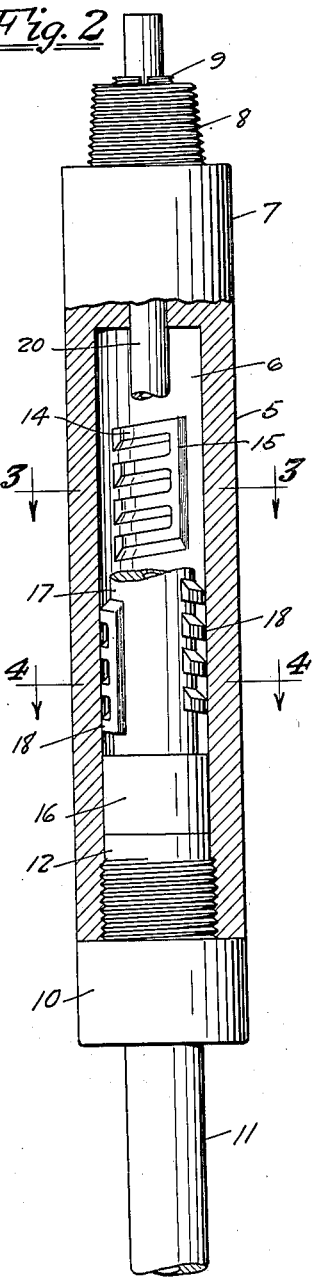
Figure 3:
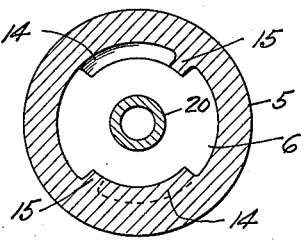
Figure 4:
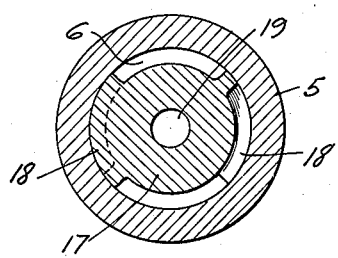

The above mentioned objects are secured by the embodiment of my invention illustrated in the accompanying drawing, in which:

Fig. 1 is a sectional view through my improved jar, showing the parts thereof in contracted position; Fig. 2 is a view similar to Fig. 1 showing the parts in expanded position; Fig. 3 is a section as seen on the line 3—3 of Fig. 2; and Fig. 4 is a section as seen on the line 4—4 of Fig. 2.

Referring more particularly to the drawing, the body or cage 5 is cylindrical and has a bore 6 extending the length thereof but reduced in diameter at the upper end so that a head 7 is formed. This head is provided with a tapered pin 8. A stuffing box 9 is formed in the head to pack a stem later described. The lower end of the cage 5 is threaded to receive a plug 10 bored to slidably receive a tubular leg 11. The plug is formed with an anvil 12 to receive the impact of a hammer later described. Adjacent the top of the cage is a mutilated thread 14 formed of two diametrically opposed portions occupying each substantially one-quarter of the circle. These threads form in effect shoulders which are inclined to the axis of the bowl. The threads are closed at one side by fillets 15.

Disposed within the cage is a hammer consisting of an annular hammer head 16 adapted to engage the anvil 12, as best shown in Fig. 2. The hammer head is formed upon a shank 17 provided with threads 18 corresponding to the threads on the cage. The hammer has a cylindrical bore 19, to which is connected a stem 20 extending through the head 7. At the bottom is connected the tubular extension 11. Thus, a continuous passage is formed through the jar for the circulation of liquid therethrough.

The jar is placed in a string of tubing, a fishing tool being at the bottom thereof. Upon getting a grip upon the lost part, the jar is contracted by lowering the string so that the segments of the thread on the hammer shank slide between the segments of the thread on the cage, the threads on the hammer and cage registering. Thereupon, the cage is rotated so that the threads mesh, a quarter turn being sufficient. The fillets 15 prevent the hammer from riding out of mesh with the cage thread, and furthermore, in this position, continuous rotation of the string may be effected. Having placed the threads in mesh, a pull is exerted upon the string, and after the proper tension has been reached, the jar is turned or rotated. Rotation of the two parts causes the segments of the threads to ride out of mesh and trip, whereupon the hammer strikes the anvil causing a jar or impact upwardly. Iron or metal pipe or tubing used in oil well work has elasticity which is very appreciable in a string of the length commonly used in wells. This elasticity assists in creating the jarring effect upon release of the hammer.

What I claim is:

1. A rotary jar comprising two sections slackly linked together and rotatable with respect to one another, shoulders on said sections arranged so that they may engage one another and hold said sections in a contracted position, said shoulders being arranged so that by rotating said sections they may disengage thereby tripping and permitting the sections to be arrested by impact of the linked parts, characterized by the shoulders being formed by corresponding mutilated threads on said sections.

2. A rotary jar comprising two sections slackly linked together so as to be contracted and expanded and to have relative rotary movement, trip means to arrest the movement of said sections in a contracted position and to take a tensile strain, said trip means being arranged to be released by relative rotation of said sections and to freely permit movement of said sections to their expanded position where they are arrested by impact, characterized by said trip means comprising oppositely disposed mutilated thread segments on one section and corresponding thread segments on the other section and abutments between the threads to limit angular movement of the sections.

3. A rotary jar comprising a cage having an anvil at the bottom, a hammer having a shank and head slidably mounted therein for axial movement so that when expanded the head engages said anvil, trip means to arrest the movement of said hammer above said anvil and take a tensile strain, said trip means being arranged to be released by relative rotation of said cage and hammer, characterized by said trip means comprising oppositely disposed mutilated thread segments on the cage spaced above said anvil and corresponding thread segments on the shank of said hammer.

4. A rotary jar comprising a cage having an anvil at the bottom, a hammer mounted therein for axial movement, said hammer having a shank and a head so that when expanded said head engages said anvil, trip means to arrest the movement of said hammer above said anvil and to take a tensile strain characterized by said trip means comprising oppositely disposed mutilated thread segments on said cage above said anvil corresponding thread segments on said shank and abutments between said threads to limit angular movement.

In witness that I claim the foregoing I have hereunto subscribed my name this 11th day of January, 1924.

JAMES ALLEN KAMMERDINER.